US009458953B2

(12) United States Patent
Kjølseth

(10) Patent No.: US 9,458,953 B2
(45) Date of Patent: Oct. 4, 2016

(54) METHOD FOR INSTALLATION OF A PIPE BASED SYSTEM, AND A PIPE BASED SYSTEM PARTICULARLY SUITABLE FOR THE METHOD

(75) Inventor: Trygve Kjølseth, Oslo (NO)

(73) Assignee: Mirador AS, Oslo (NO)

( * ) Notice: Subject to any disclaimer, the term of this patent is extended or adjusted under 35 U.S.C. 154(b) by 165 days.

(21) Appl. No.: 14/127,122

(22) PCT Filed: Jun. 27, 2012

(86) PCT No.: PCT/NO2012/050122
§ 371 (c)(1),
(2), (4) Date: Dec. 17, 2013

(87) PCT Pub. No.: WO2013/015693
PCT Pub. Date: Jan. 31, 2013

(65) Prior Publication Data
US 2014/0116528 A1 May 1, 2014

(30) Foreign Application Priority Data
Jul. 1, 2011 (NO) .................................. 20110956

(51) Int. Cl.
F16L 9/00 (2006.01)
E04G 7/20 (2006.01)
F16L 13/11 (2006.01)
F16L 47/02 (2006.01)

(52) U.S. Cl.
CPC . F16L 9/00 (2013.01); E04G 7/20 (2013.01); F16L 13/116 (2013.01); F16L 47/02 (2013.01);
(Continued)

(58) Field of Classification Search
CPC ......... F16L 9/00; F16L 13/116; F16L 47/02; E04G 7/20; Y10T 29/53917; Y10T 29/53687; Y10T 29/53843; Y10T 29/53657; Y10T 29/49826; Y10T 29/49927; Y10T 29/4987; Y10T 137/9029; Y10T 137/0402
See application file for complete search history.

(56) References Cited

U.S. PATENT DOCUMENTS 2,329,000 A 9/1943 Rembert
3,960,394 A 6/1976 Hubner et al.
(Continued)

FOREIGN PATENT DOCUMENTS

CN 101589259 A 11/2009
CN 101660638 A 3/2010
(Continued)

OTHER PUBLICATIONS

Nilsson, Lena, "International Search Report," prepared for PCT/NO2012/050122, as mailed Oct. 16, 2012, 4 pages.

Primary Examiner — John C Hong
(74) Attorney, Agent, or Firm — Winstead PC

(57) ABSTRACT

Method for installation of a pipe based system (pipe system) comprising pipe lengths and coupling components, distinguished in that the method comprises the steps: to pre-assemble the pipeline system loosely by assembling pipe lengths and coupling components by inserting pipe lengths into coupling parts, the coupling parts are adapted so as to hold the pipe length in place and in orientation while the axial pipe length position in the coupling component easily can be adjusted, and conduct optional sufficient clamping or attachments to the surrounding walls, ceilings or floors, so that the pipe system is self-supporting in the intended position and such that the assemblage of the components easily can be adjusted by a technician, to adjust the components of the pipeline system into the intended position, so that the pipeline system is basically without any inherent tensions, optionally to attach or clamp the pipeline system further onto to the surrounding walls, ceilings or floors, and to permanently join the pipe lengths and coupling components.

20 Claims, 5 Drawing Sheets

Figure 2C:
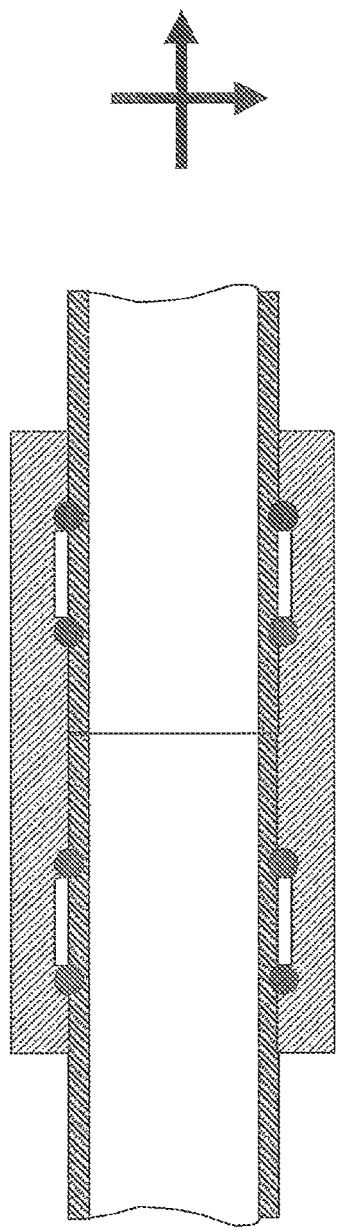
Figure 2C:
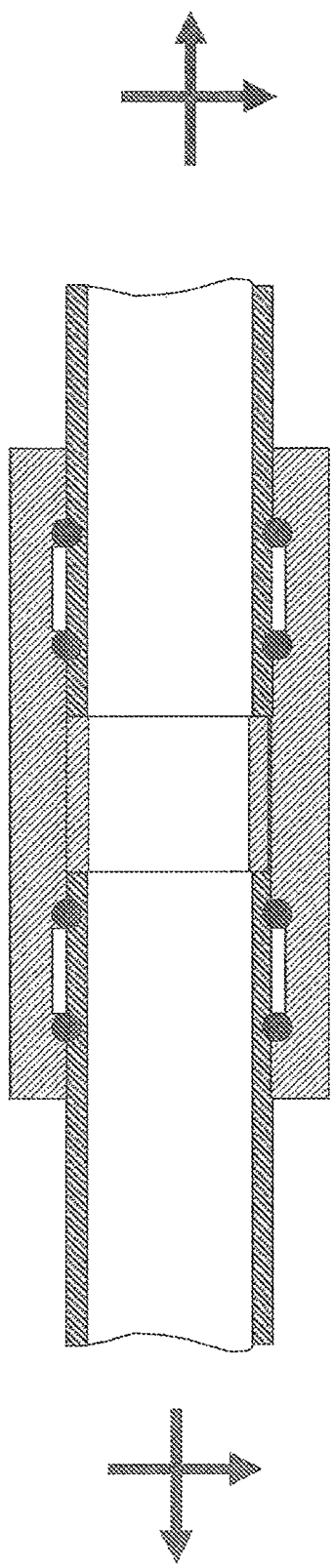

(52) U.S. Cl.
CPC ....... *Y10T 29/4987* (2015.01); *Y10T 29/49826* (2015.01); *Y10T 29/49927* (2015.01); *Y10T 29/53657* (2015.01); *Y10T 29/53687* (2015.01); *Y10T 29/53843* (2015.01); *Y10T 29/53917* (2015.01); *Y10T 137/0402* (2015.04); *Y10T 137/9029* (2015.04)

(56) References Cited

U.S. PATENT DOCUMENTS

| | | | |
|---|---|---|---|
| 5,486,024 A | 1/1996 | Dierdorf | |
| 5,685,577 A | 11/1997 | Vanesky | |
| 5,722,702 A | 3/1998 | Washburn | |
| 2010/0025982 A1 | 2/2010 | Jamison | |
| 2010/0025988 A1 | 2/2010 | Jamison | |
| 2010/0072741 A1 | 3/2010 | Kjolseth et al. | |
| 2010/0259040 A1 | 10/2010 | Kjolseth et al. | |

FOREIGN PATENT DOCUMENTS

| | | |
|---|---|---|
| CN | 101755161 A | 6/2010 |
| DE | 20 2009 012 173 U1 | 12/2009 |
| GB | 1293371 A | 10/1972 |
| GB | 2423559 A | 8/2006 |
| WO | WO-9502144 A1 | 1/1995 |
| WO | WO-2008/147213 A1 | 12/2008 |

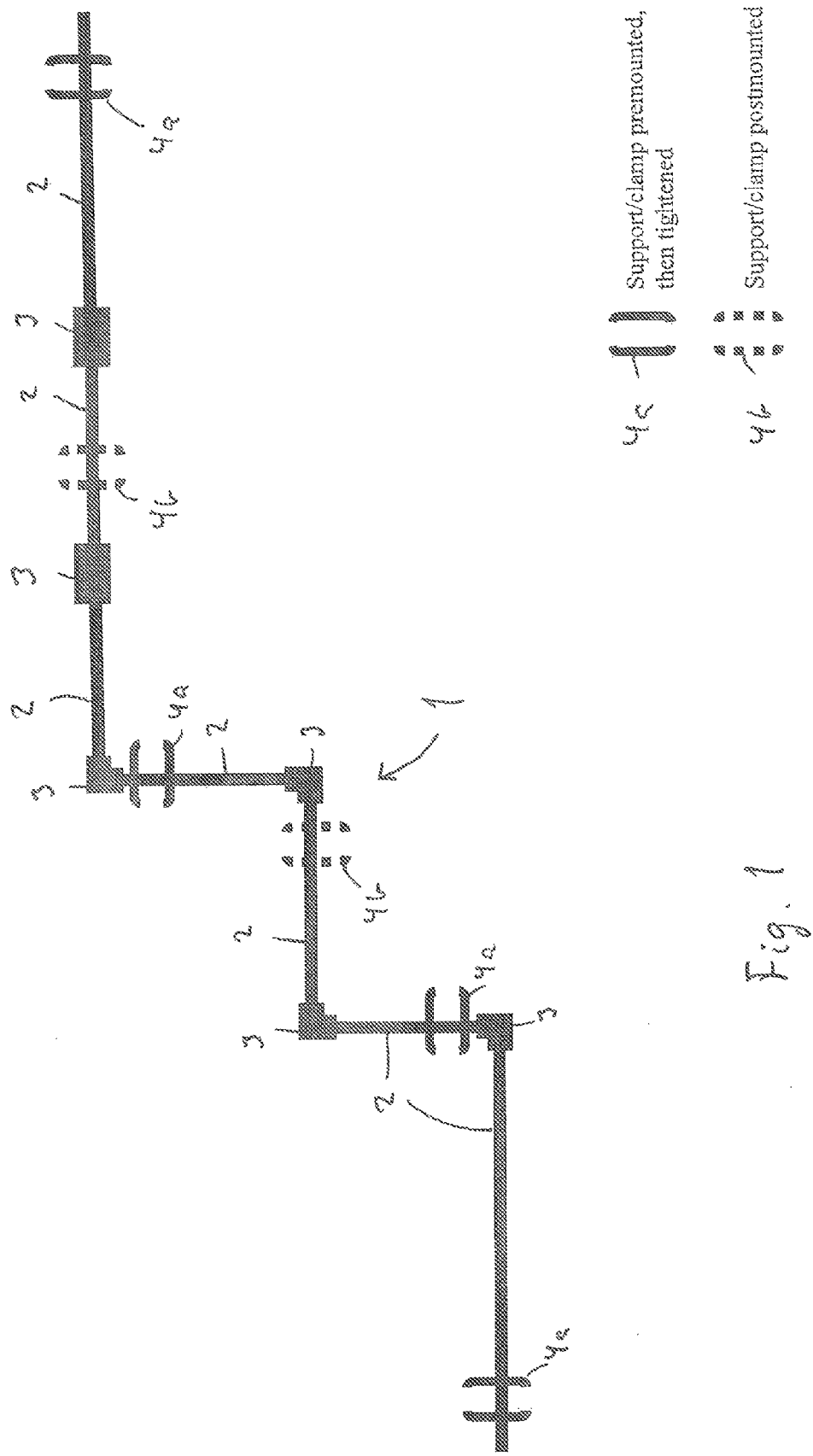

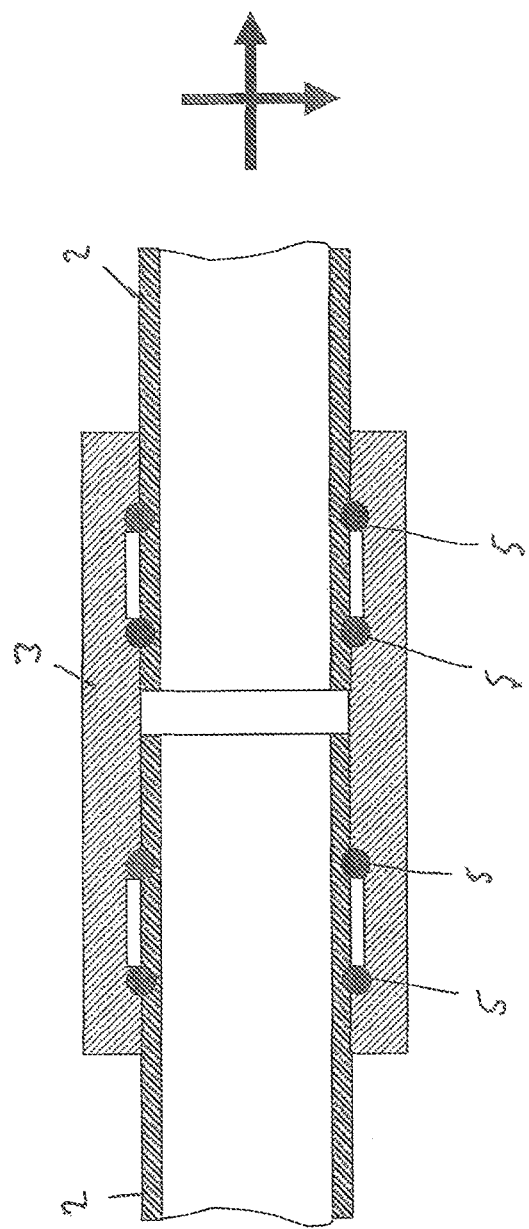

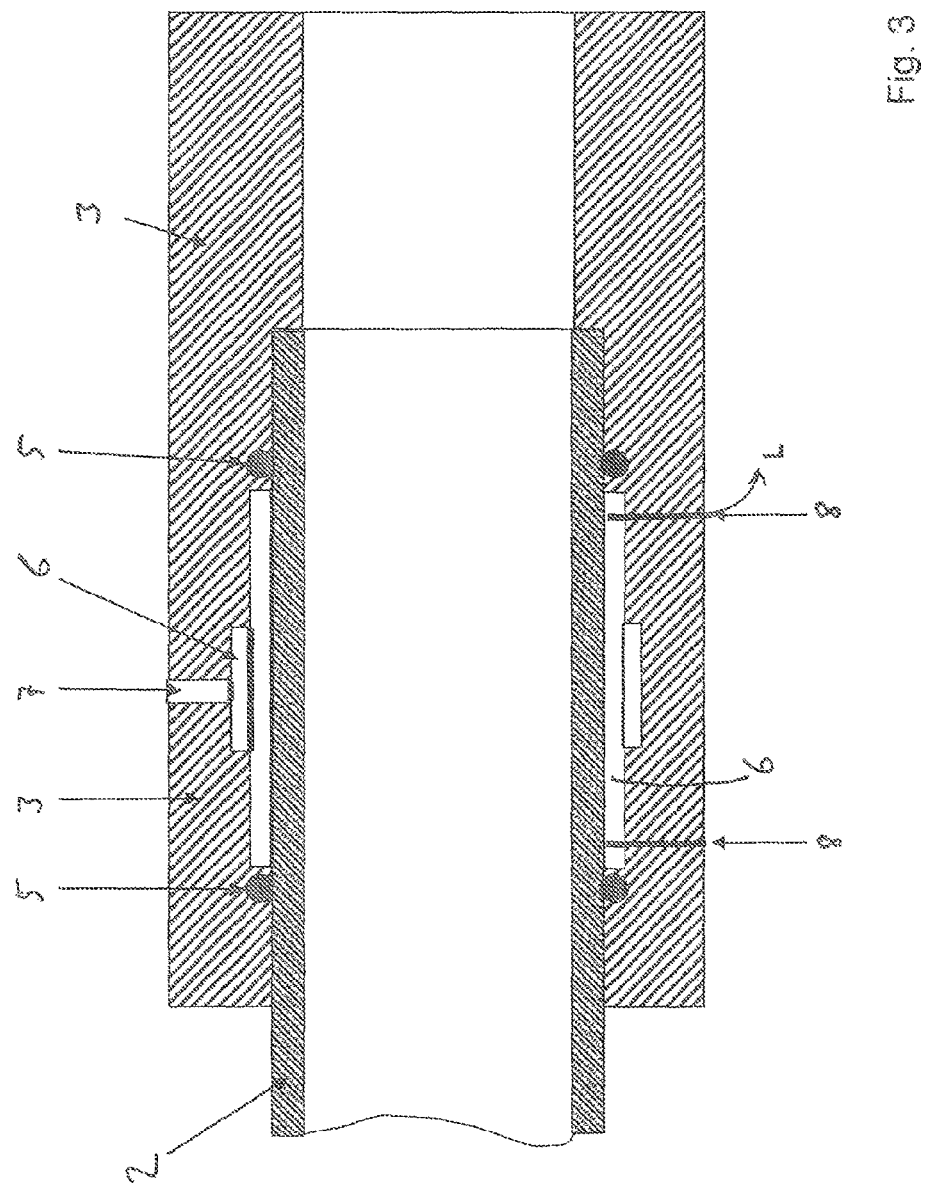

METHOD FOR INSTALLATION OF A PIPE BASED SYSTEM, AND A PIPE BASED SYSTEM PARTICULARLY SUITABLE FOR THE METHOD

FIELD OF INVENTION

The present invention is related to pipe systems, particularly pipe systems for low to moderate pressures, with small to moderate dimensions, for fluids of low or moderate risk at leakages, but also pipe systems for high pressures, i.e. pressures above 200 bar, and similar systems such as railings and scaffolding. More specifically, the invention is related to a method for installation of a pipe based system, and a pipe based system particularly suitable to conduct the method.

BACKGROUND FOR THE INVENTION AND PRIOR ART

For pipe systems on cruise vessels, hotels and some other places with many pipes and fittings for the management of water, mild chemicals and other fluids of moderate to low toxicity and pressures, the installation costs constitute up to 90% of the total costs for the pipe system. This is particularly the case for pipes and fittings in pressurized pipe systems being clamped on to a wall or below the ceiling, often being high and inconveniently positioned.

Traditionally, pressurized pipe systems have been made in metallic materials that are being welded, soldered or threaded and screwed together: Those are time consuming processes as such, but will also require that each component must be precisely adapted and jointed at the same time as the system is being clamped.

Pipe systems of the most relevant types are built and adapted to the specific situations at the building site at the time of assembly, with the required directional deviations around the obstacles. Typically, there is a fitting or a directional deviation for every 1-2 m of pipe length.

Glued connections, clamp connections and quick connections have gradually been implemented. These connections are often easy to assemble since the pipe system is assembled in a ditch, or is placed at a flat surface. When pipe systems are to be adapted precisely, fixed into place, and hence are built high onto a wall, in pipe trenches or pipe racks, and below ceilings, it is cumbersome, time consuming and with no flexibility in the building process when every pipe joint has to be fastened continuously.

Also, railings, scaffolding and other systems with professional work are relevant for the invention, since corresponding or similar problems may also be found for such systems.

It is an aim to achieve a reduction in the total costs for pipe based systems of the type initially being discussed, and the purpose of the present invention is to contribute in achieving the stated aim.

SUMMARY OF THE INVENTION

The invention provides a method for installation of a pipe based system (pipe system) comprising pipe lengths and coupling components, distinguished in that the method comprises the steps:

to pre-assemble the pipeline system loosely by assembling pipe lengths and coupling components by inserting pipe lengths into coupling parts, the coupling parts are adapted so as to hold the pipe length in place and in orientation whilst the axial pipe length position in the coupling component easily can be adjusted, and conduct optional sufficient clamping or attachments to the surrounding walls, ceilings or floors, so that the pipe system is self-supporting in the intended position and such that the assemblage of the components easily can be adjusted by a technician, to adjust the components of the pipeline system into the intended position, so that the pipeline system is basically without any inherent tensions, optionally to attach or clamp the pipeline system further onto to the surrounding walls, ceilings or floors, and to permanently join the pipe lengths and coupling components.

The coupling component preferably comprises openings containing at least two elements with dimensions and elastic rigidity that both provide directional stability, holding stability and glue sealing or clamp sealing, in the form of at least two axially to each other arranged O-rings or similar sealing elements with corresponding gliding, adjustable sealing functionality between the pipe length and the coupling component, the sealing elements are arranged in a distance in the order of 0.4 to 1.5 times the diameter of the pipe length axially from each other, preferably approximately 0.5 times the pipe diameter from each other, preferably the rigidity and insert depth are such that the weight of a two meters pipe length may be held and positioned, such that force for axial insert and positional adjustments which, combined with an easy twisting, is 2-100, more preferably 5-80, more preferably 10-70, most preferably approximately 40 N, and when having only axial movement without twisting 5-150, more preferably 10-80, most preferably approximately 60 N.

The pipe component preferably comprises labeling that provides information related to correct insert length in the coupling component, where the length interval for correct insert length is preferably from 0.2 to 4 times the pipe length diameter, more preferably 0.5 to 2 times, most preferably approximately one times the pipe length diameter, and preferably the labeling comprises a featured labeling for the minimum correct insert length of the pipe length in the coupling component, and the coupling components are adapted with opening lengths allowing axial movement, and preferably at least some of the coupling components comprise combined fastening and tightening devices.

The joint is advantageously being conducted by spraying glue through a hole in the wall of the coupling component, until the glue trickles out from an outlet, for the indication of glue being filled up completely and the glue joint being vented, where a verification plug preferably is inserted into the said outlet. Alternatively the joint is performed by means of clamping together with a tool or clamping device such as a clamp, which clamp also can be used in temporary assemblage by loosely clamping on to the pipe coupling prior to the final assembly, and is tightened in connection with the final assembly, which clamping may be preassembled onto or integrated into the coupling component.

The invention also provides a pipe based system being particularly suitable for performing the method according to the invention, featured by that the coupling components comprise openings containing at least two elements with dimensions and elastic rigidity that both provide directional stability, holding stability and glue sealing or clamp sealing, in the form of arranging at least two O-rings being axially to each other or similar sealing elements with a correspondingly gliding, adjustable sealing between the pipe length and the coupling component, the sealing elements are arranged axially from each other with a spacing in the order of 0.4 to 1.5 times the diameter of the pipe length, preferably from each other with approximately 0.5 times the pipe diameter, and preferably the rigidity and insert depth are such that the weight of a two meters pipe length may be maintained, such that force for axial insert and positional adjustments which, combined with an easy twisting, is 2-100, more preferably 5-80, more preferably 10-70, most preferably approximately 40 N, and with only axial movement but without twisting 5-150, more preferably 10-80, most preferably approximately 60 N.

Advantageously, the pipe parts comprise a labeling that provides information related to the correct insert length in the coupling component, preferably the length interval for correct insert length is from 0.2 to 4 times the pipe length diameter, more preferably 0.5 to 2 times, most preferably approximately one times the pipe length diameter, and the labeling preferably comprises a featured labeling for the minimum correct insert length of the pipe length in the coupling component, and the coupling components are adapted with opening lengths allowing axial movement and at least some of the coupling components preferably comprise combined fastening and tightening devices.

The pipe based system is, in one embodiment, a pipe system for fluids, preferably a composite pipe system where pipe lengths and coupling components are glued together. In another embodiment there is a pipe based system for railings, and in another embodiment for scaffolding, and in a further embodiment the pipe based system according to the invention is a professional work for use in supporting structures such as timber framework or reinforcement, as a self-supportive structure or as being fastened to the surrounding walls, floors or ceilings.

The term pipe based system is to be interpreted broadly in connection with the invention. It is to include elements where the technical contribution from the invention may be naturally applied. The pipe based system therefore includes different cross-sectional shapes, such as triangular and square pipes, hollow or solid long elements that can be joined with the coupling components. The final joint may comprise different fastening methods, including such techniques as welding, soldering, screwing and riveting.

Central to the invention is that each component is brought together, and is kept together with a provisional adhesion/friction, that allow an entire system to be dry assembled in the final position, and adapted/adjusted and clamped before the final joining can be done. The invention is based on that the pipe is inserted into a coupling, where typically there are 2 O-rings assembled with a spacing in between them. The function of the O-rings is to add to the friction that longitudinally holds the pipe insertion at place, and secondly due to that the distance between the O-rings adds directional longitudinal stability.

Other pipe systems, such as clamping systems (press fitting systems), have an O-ring that may provide a certain withdrawal resistance, but no directional resistance.

With the invention, a large time-saving is achieved, with a correspondingly financial saving. For the typical pipe systems, we here speak of 70-90% of the completed installed costs for the assemblage costs for the pipe system. The invention reduces the working time and hence the assemblage costs, with up to 50%.

Improved working environment is also an essential point, where the technicians are doing heavy work where the working operations take place at heights above the head. There may be a lot of running up and down ladders/positions to measure, cut, fasten, bring components, adapt and adjust. Accidents and injuries may occur when working on ladders/positions.

Probability is high for gaining improved quality and accuracy, in that cutting and adaptions will be easier to perform, and that the system becomes essentially free of tensions. This will also eliminate temptations of using power to force together those components that are adapted with an insufficient accuracy, which may impose tensions that have not taken sufficiently care of in the dimensioning, and that later may lead to damages during the operational efforts. The invention will be particularly advantageous for clamped, rigid pipe systems for pressurized pipes that are for a non-critical use.

FIGURES

The invention is illustrated with three figures, in which:

FIG. 1 illustrates a pipe system and the features of the method according to the invention, FIGS. 2a, 2b and 2c, which illustrate a coupling component and the end of a pipe length in a pipe system according to the invention, and FIG. 3 illustrates an embodiment of a coupling component and the end of a pipe length in a pipe system according to the invention, being somewhat more detailed.

DETAILED DESCRIPTION

Reference is made to FIG. 1, where a pipe based system is illustrated, in which there is a pipe system 1 according to the invention. The pipe system comprises pipe lengths 2 and coupling components 3, as well as fastening devices, supports or clamps 4a and 4b, of which clamps 4a are assembled first, and clamps 4b are assembled later, in connection with a permanent joining and fastening of the pipe system after it has been adapted, to be essentially free of tensions and being arranged at an intended place and manner.

FIGS. 2a and 2b illustrate a coupling component 3 and the end of two pipe lengths 2 in a pipe system according to the invention, in different positions, for example before and after adjustment. FIG. 2c illustrates a similar embodiment.

FIG. 3 illustrates an embodiment 3 and the end of a pipe length 2 in a pipe system, in more detail. More specifically, a coupling component with an annular space 6 for a glue line is illustrated. Glue is injected in through an opening 7, until the glue is trickling out from the opposite, oriented and axially staggered verification and venting holes 8 at the other side of the coupling.

The invention claimed is:
1. A method for installation of a pipe system comprising pipe lengths and coupling components, the method comprising:
pre-assembling the pipe system loosely by assembling the pipe lengths and the coupling components by inserting the pipe lengths into coupling parts, the coupling components comprising two sealing elements spaced axially apart and positioned so as to allow axial adjustment in or out and rotation of the pipe lengths, and elastic rigidity adapted so as to hold the pipe lengths in place and in orientation whilst an axial pipe length position in the coupling component easily can be adjusted, and conduct optional sufficient clamping or attachments to surrounding walls, ceilings or floors, so that the pipe system is self-supporting in an intended position and such that assemblage of the components easily can be adjusted by a technician;

adjusting the components of the pipe system into the intended position, so that the pipeline system is without any inherent tensions;

attaching the pipeline system further onto to the surrounding walls, ceilings or floors; and permanently joining the pipe lengths and coupling components.

2. The method according to claim 1, the coupling component comprising openings containing at least two elements with dimensions and elastic rigidity that both provide directional stability, holding stability and glue sealing or clamping sealing, the at least two elements comprising at least two O-rings axially arranged apart to each other or similar sealing elements with a correspondingly gliding, adjustable sealing between the pipe length and the coupling component; and the sealing elements are axially arranged from each other with a spacing being in the order of 0.4 to 1.5 times a diameter of the pipe length.

3. The method according to claim 2, wherein the sealing elements are axially arranged from each other with a spacing being in the order of approximately 0.5 times the pipe diameter from each other.

4. The method according to claim 3, wherein the elastic rigidity and insert depth are such that the weight of a two meters pipe length can be maintained, such that force for axial insert and positional adjustments which, combined with an easy twisting, is 2-100 Newtons.

5. The method according to claim 4 wherein the elastic rigidity and insert depth are such that the weight of a two meters pipe length can be maintained, such that force for axial insert and positional adjustments which, combined with an easy twisting, is 5-80 Newtons.

6. The method according to claim 4, wherein the elastic rigidity and insert depth are such that the weight of a two meters pipe length can be maintained, such that force for axial insert and positional adjustments which, without twisting, is 5-150 Newtons.

7. The method according to claim 5, wherein the elastic rigidity and insert depth are such that the weight of a two meters pipe length can be maintained, such that force for axial insert and positional adjustments which, combined with an easy twisting, is 10-70 Newtons.

8. The method according to claim 5, wherein the elastic rigidity and insert depth are such that the weight of a two meters pipe length can be maintained, such that force for axial insert and positional adjustments which, without twisting, is 10-80 Newtons.

9. The method according to claim 7, wherein the elastic rigidity and insert depth are such that the weight of a two meters pipe length can be maintained, such that force for axial insert and positional adjustments which, combined with an easy twisting, is approximately 40 Newtons.

10. The method according to claim 7, wherein the elastic rigidity and insert depth are such that the weight of a two meters pipe length can be maintained, such that force for axial insert and positional adjustments which, without twisting, is approximately 60 Newtons.

11. The method according to claim 1, wherein:

the pipe component comprises labeling that provides information related to a correct insert length in the coupling component;

the length interval for correct insert is 0.2 to 4 times the pipe length diameter;

the labeling comprises a featured labeling for a minimum correct insert length of the pipe length in the coupling component;

the coupling components are adapted with opening lengths that allow for axial movement; and at least some of the coupling components comprise combined fastening and tightening devices.

12. The method according to claim 11, wherein the length interval for correct insert is 0.5 to 2 times the pipe length diameter.

13. The method according to claim 12, wherein the length interval for correct insert is approximately one times the pipe length diameter.

14. The method according to claim 1, wherein:

a joint is conducted by spraying glue through a hole in a wall of the coupling component, until the glue trickles out from an outlet, for indication of glue being completely filled and that the joint is being vented;

a verification plug is inserted into the outlet;

the joint is performed via clamping together with a tool or clamping device that also can be used in temporary assemblage by loosely clamping on to the pipe coupling prior to the final assembly, and is being tightened in connection with the assembly; and the clamping can be preassembled onto or integrated into the coupling component.

15. A pipe based system suited for conducting the method according to claim 1, wherein:

the coupling components comprise openings containing at least two elements, with dimensions and elastic rigidity that both provide directional stability, holding stability and glue sealing or clamp sealing, in the form of arranging at least two O-rings being axially to each other, or similar sealing elements with correspondingly gliding; and adjustable sealing between the pipe length and the coupling component, the sealing elements are arranged axially from each other with a spacing being in the order of 0.4 to 0.65 times the diameter of the pipe length.

16. The pipe based system according to claim 15, wherein:

the coupling component comprises labeling that provides information related to a correct insert length in the coupling component; and the coupling components are adapted with opening lengths that allows for axial movement.

17. The pipe based system according to claim 15, wherein the system is a pipe system for fluids.

18. The pipe based system according to claim 15, wherein the system is for railing.

19. The pipe based system according to claim 15, wherein the system is for scaffolding.

20. The pipe based system according to claim 15, wherein the system is for professional work for use in supportive structures as a self-supportive structure or as fastened to surrounding walls, floors or ceilings.

\* \* \* \* \*